US011107137B2

(12) United States Patent
Nolan et al.

(10) Patent No.: US 11,107,137 B2
(45) Date of Patent: Aug. 31, 2021

(54) SYSTEM, METHOD AND APPARATUS FOR AUTOMATIC CATEGORIZATION AND ASSESSMENT OF BILLING NARRATIVES

(71) Applicant: Shine Analytics Ltd., Dublin (IE)

(72) Inventors: Ian Nolan, Dublin (IE); Alex Kelly, Dublin (IE); Ciaran Flood, Longford (IE); Sean Harrison, Offaly (IE); Michael Dineen, Dublin (IE)

(73) Assignee: SHINE ANALYTICS LTD., Dublin (IE)

( * ) Notice: Subject to any disclaimer, the term of this patent is extended or adjusted under 35 U.S.C. 154(b) by 154 days.

(21) Appl. No.: 15/482,133

(22) Filed: Apr. 7, 2017

(65) Prior Publication Data

US 2017/0293951 A1    Oct. 12, 2017

Related U.S. Application Data

(60) Provisional application No. 62/320,882, filed on Apr. 11, 2016.

(51) Int. Cl.
| | | |
|---|---|---|
| *G06Q 30/04* | (2012.01) | |
| *G06N 20/00* | (2019.01) | |
| *G06Q 10/10* | (2012.01) | |
| *G06N 5/02* | (2006.01) | |

(52) U.S. Cl.
CPC ............. *G06Q 30/04* (2013.01); *G06N 5/025* (2013.01); *G06N 20/00* (2019.01); *G06Q 10/10* (2013.01); *G06Q 10/1091* (2013.01)

(58) Field of Classification Search
CPC ........ G06Q 30/40; G06Q 10/10; G06N 20/00; G06N 5/025

USPC ......... 705/32, 35, 39, 40, 14.53, 14.66, 7.33
See application file for complete search history.

(56) References Cited

U.S. PATENT DOCUMENTS

| | | | | |
|---|---|---|---|---|
| 8,719,121 | B1* | 5/2014 | Leason | G06Q 10/1091 705/32 |
| 2006/0004604 | A1* | 1/2006 | White | G06Q 20/102 705/2 |
| 2010/0169234 | A1* | 7/2010 | Metzger | H04W 4/24 705/348 |
| 2012/0246130 | A1* | 9/2012 | Schmidt | G06Q 50/18 707/694 |
| 2013/0144605 | A1* | 6/2013 | Brager | G06F 40/40 704/9 |

(Continued)

OTHER PUBLICATIONS

International Search Report and Written Opinion, dated Jul. 24, 2017, International Application No. PCT/IB2017/000498.

(Continued)

*Primary Examiner* — Vanel Frenel
(74) *Attorney, Agent, or Firm* — Lewis Roca Rothgerber Christie LLP

(57) ABSTRACT

A system for automatic categorization and assessment of billing narratives has a semantic engine that classifies billing entries with descriptions expressed in natural language into standardized categories of activity and task objective. The classification is by machine learning methods via training data that is maintained, updated and extended as needed. A rules engine applies rules to the categorized invoice data to analyze the data, report violations to a user/consumer of billed services and to perform related calculations.

18 Claims, 11 Drawing Sheets

(56) References Cited

U.S. PATENT DOCUMENTS

| | | | | |
|---|---|---|---|---|
| 2014/0006231 A1* | 1/2014 | Salgueiro | ............... | G06Q 30/04 |
| | | | | 705/30 |
| 2014/0365232 A1* | 12/2014 | Sadeghi | ................. | G06F 40/14 |
| | | | | 705/2 |
| 2015/0364128 A1* | 12/2015 | Zhao | ................... | G06N 3/0445 |
| | | | | 704/259 |
| 2016/0086222 A1* | 3/2016 | Kurapati | ............ | G06Q 30/0204 |
| | | | | 705/14.53 |
| 2016/0125511 A1* | 5/2016 | Shaaban | ................ | G06Q 20/14 |
| | | | | 705/26.81 |

OTHER PUBLICATIONS

Communication pursuant to Article 94(3) EPC dated Aug. 16, 2019 in European Patent Application No. 17731258.4.
Examination report No. 1 for standard patent appicaton dated Nov. 2, 2019 in Australian Patent Application No. 2017248777.

* cited by examiner

Sample Legal Invoice Narrative Line Data

| Description | Date | Time | Timekeeper | Rate | Total |
|---|---|---|---|---|---|
| Attend to Due Diligence Matters Including Preparation for Upcoming Calls and Attend to Related Matters. | 04/03/2015 | 1:36 | John Smith - Associate | $450 | $720 |
| Conference Call with S. Doyle, Attend to Investor Presentation; Attend to BackUp Binder; Attend to MOU. | 04/03/2015 | 2:10 | John Smith - Associate | $450 | $945 |
| Attend to Board Summary; Review Underwriting Agreement and Legal Opinions; Update Call with Client. | 04/05/2015 | 1:45 | Mary Jones - Partner | $550 | $962.50 |

FIG. 2

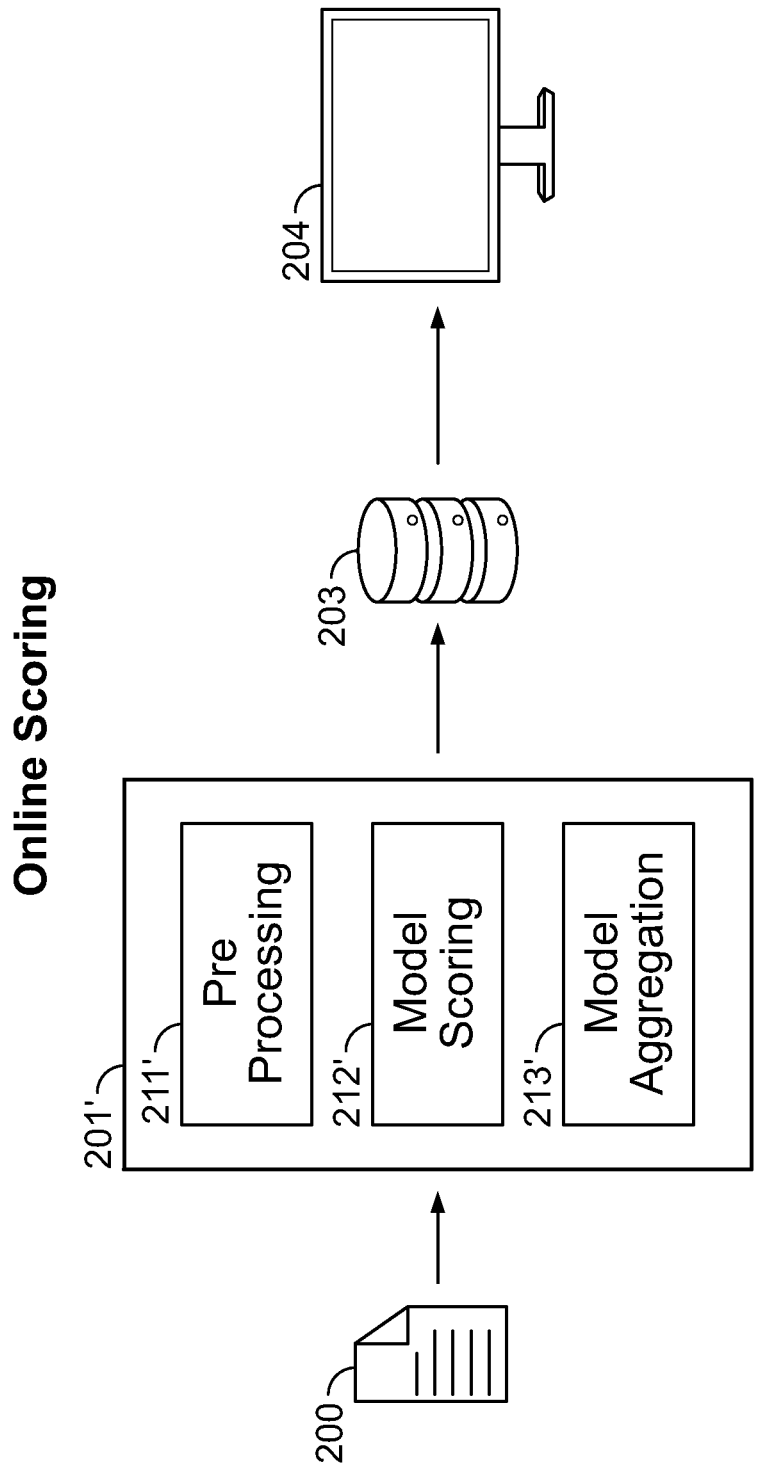

Sample Report Comparing Resourcing of Two Similar Projects

340

| Project A | | $1,100,340 | Project B | | $923,002 |
|---|---|---|---|---|---|
| Task | Proportion of Matter | Spend | Task | Proportion of Matter | Spend |
| Preparation of Connection Reviews | 4.20% | $46,214 | General Due Diligence | 6.83% | $63,041 |
| Issues Logs | 3.18% | $34,991 | Completion Checklist | 4.25% | $39,228 |
| Scheduling and/or Uploading of Other Connection Documentation | 2.67% | $29,379 | Disclosure Exercises | 2.79% | $25,752 |
| Time on Property Tracker | 1.38% | $15,185 | Remediation and Associated Work | 2.50% | $23,075 |
| Project Management | 1.09% | $11,994 | Services Agreement | 2.42% | $22,337 |
| Due Diligence | 0.73% | $8,032 | Client Communication | 1.88% | $17,352 |
| Excel Spreadsheet Trackers | 0.56% | $6,162 | Regulatory Advice | 1.39% | $12,830 |
| Property Due Diligence | 0.29% | $3,191 | Consumer Protection Research | 1.28% | $11,814 |
| Regulatory Advice | 0.28% | $3,081 | Note of Advice | 1.03% | $9,507 |
| Review of Auditors Summary Reports | 0.03% | $330 | Overdraft Completion | 1.25% | $11,538 |

FIG. 10

SYSTEM, METHOD AND APPARATUS FOR AUTOMATIC CATEGORIZATION AND ASSESSMENT OF BILLING NARRATIVES

CROSS REFERENCE TO RELATED APPLICATIONS

This application claims the benefit of U.S. Provisional Application No. 62/320,882, filed, Apr. 11, 2016, entitled, System, Method and Apparatus for Automatic Categorization and Assessment of Billing Narratives, which is incorporated by reference herein in its entirety.

FIELD

The present application relates to systems for billing, accounting and reporting, and more particularly to automated systems capable of conducting automated analysis and reporting.

BACKGROUND

The analysis of billing/invoices, e.g., in itemized invoices for fee-for-services performed has typically been an activity that has been conducted by a person who examines the bill and then approves or declines to pay based upon their judgment as to what they think is appropriate. This type of analysis may arise in any number of service activities, such as in building construction, software consulting, engineering consulting, in billing for legal services and in many other areas where services are performed and billed based upon time spent. Typically an invoice lists the services performed, who performed them, the time spent, the billing rate, etc. in order to provide the facts necessary to calculate the fee for services performed. The nature of this type of billing, e.g., for legal work, has historically made it difficult to accurately forecast the inputs necessary to complete most streams of work. Hourly billing has been the norm in industries such as the legal industry for decades. This makes it difficult for clients, such as, corporate entities, to budget and control their legal costs, since the pricing/cost is often unpredictable.

An historical lack of transparency on the part of service providers has exacerbated this problem. In an effort to create more transparency, invoices, e.g., from law firms, have begun to include full narrative detail of the work performed. This includes describing what tasks were performed, by whom, how long it took, and what hourly rate was applied.

In an effort to create a standardization of narratives for the purpose of invoice processing and strategic cost control, an industry standard of task codes was created—the Uniform Task Based Management System (UTBMS). While the goals of UTBMS coding were well intentioned, the realities of implementation within the legal eco-system have made adoption extremely low. Because of the large number of different UTBMS codes, manually coding individual invoice lines (either by the supplier or by the purchaser) is labor intensive and often inaccurate. As a result, there has been very low adoption of the UTBMS code system.

In addition to the lack of adoption of UTBMS, a lack of granularity in the coding framework, as well as a lack of focus on non-litigation work, makes the codes unsuitable for effective cost control analysis. Accordingly, alternative systems and methods for coding invoice task lines and analyzing invoices to aid purchasers of legal and other services to more accurately and efficiently judge the reasonableness of charges from service providers are desirable.

SUMMARY

The disclosed subject matter relates to automated classification of natural language descriptions of billed tasks by a service provider. In an embodiment of the present disclosure, a method for the analysis of an invoice with a timekeeper narrative presented by a provider of professional services to a recipient of same, includes the steps of: obtaining the invoice with timekeeper narrative as invoice data in a digital alphanumeric form; receiving the invoice data into a computer having access to a data store coupled thereto; storing the invoice data in the data store; processing the invoice data by a semantic engine, the semantic engine decomposing the invoice data fragments pertaining to actions performed by the provider and objects of action; obtaining a standard categorization of actions and objects of action in digital form; storing the standard categorization on the data store or another data store accessible to the computer; automatically categorizing the invoice data fragments in terms of the standard categorization yielding a standard categorization of the invoice data; providing an output of the standard categorization of the invoice data in textural data form.

In another embodiment, further including the steps of defining at least one rule applicable to invoicing parameters and providing the standard categorization of the invoice data to a rules engine capable of evaluating the at least one rule; and applying the at least one rule to the standard categorization of the invoice data.

In another embodiment, the at least one rule specifies an output based upon the application of the rule to the standard categorization of the invoice data and generating the output defined by the at least one rule in the form of a report.

In another embodiment, further including the step of generating a database of pre-categorized text fragments based upon prior evaluation of a sample set of invoices; storing the database on a data store accessible to the computer and accessing the database during the step of automatically categorizing.

In another embodiment, further including the step of evaluating the accuracy of the step of automatically categorizing resulting in additional entries to the database.

In another embodiment, further including the steps of building a database of the identity of persons associated with at least one of the provider or recipient and including the role of the persons; storing the database of persons in a data store accessible to the computer and referring to the database during the step of categorizing, the step of categorization incorporating the roles of persons involved in the professional services as provider or recipient as identified in the invoice data.

In another embodiment, the rules include at least one of best practice norms or terms of engagement.

In another embodiment, further including the step of changing the rules under the direction of the recipient of the services.

In another embodiment, the violation of a rule results in generation of a pre-determined output message.

In another embodiment, the semantic engine has a training layer and further comprising the steps of developing training data and providing the training data to the training layer of the semantic engine prior to the step of processing the invoice data.

In another embodiment, further including a step of preprocessing the invoice data by tokenizing the invoice data into word and sentence fragments and then transforming the words into a lemmatized form.

In another embodiment, further including processing the words in lemmatized form by n gram extraction, part of speech tagging and dependency parsing through analysis of the syntactic structure of the invoice data.

In another embodiment, further including the step of extracting named entities from the invoice data.

In another embodiment, further including the steps of model training, model aggregation and model evaluation.

In another embodiment, the step of model training includes the step of term weighting, category binarization, feature selection and parameter tuning.

In another embodiment, the step of model aggregation includes the steps of ensemble tuning, probability thresholding and result combination.

In another embodiment, the step of model evaluation includes the steps of metric generation and error modeling.

In another embodiment, further including developing a database of person and billing rates, storing the database in a data store accessible to the computer and calculating charges by persons on behalf of the provider.

In another embodiment, an apparatus for the automated analysis of actual invoices and timekeeper narratives from a service provider, includes: a computer with a processor; a data store accessible to the computer and capable of storing invoice data in digital textural form; a semantic engine capable of running on the processor, the semantic engine having a learning layer and a processing layer, the learning layer receiving training data containing accurately decomposed and categorized invoice data from a training sample of invoice data and developing a training model, the processing layer receiving the training model and processing the actual invoice data in accordance with the training model, resulting in the decomposition of the actual invoice data into fragments pertaining to actions performed and objects of actions by the provider in the form of categorized invoice data; and a rules engine capable of running on the processor having access to at least one rule applicable to categorized invoice data, the rules engine receiving the categorized invoice data from the semantic engine, applying the at least one rule to the categorized invoice data and generating an output consistent with the at least one rule.

In another embodiment, a system for automated analysis of actual invoices and timekeeper narratives from a service provider, includes: a computer with a processor; a data store accessible to the computer and capable of storing invoice data in digital textural form; a semantic engine capable of running on the processor, the semantic engine having a learning layer and a processing layer, the learning layer receiving training data containing accurately decomposed and categorized invoice data from a training sample of invoice data and developing a training model, the processing layer receiving the training model and processing the actual invoice data in accordance with the training model, resulting in the decomposition of the actual invoice data into fragments pertaining to actions performed and objects of actions by the provider in the form of categorized invoice data; a rules engine capable of running on the processor having access to at least one rule applicable to categorized invoice data, the rules engine receiving the categorized invoice data from the semantic engine, applying the at least one rule to the categorized invoice data and generating an output consistent with the at least one rule; a reporting engine, the reporting engine generating reports to a user of the categorized invoice data and output from the application of the at least one rule; and at least one additional computer connected to the computer via a network, permitting the distribution of data storage and processing task performed by the system over the computer and the at least one additional computer.

In another embodiment, the resultant data is used to categorize tasks and weighting of time against each one to determine the efficiency at which the work was performed.

In another embodiment, the categorized data is subjected to analysis by a rules engine that generates messages, performs calculations and reports. In another aspect, the aggregate classified data is reported to provide business insights into the resourcing of legal work.

In another embodiment, an automated classification of natural language descriptions of billed tasks by a service provider is conducted.

In another embodiment, the resultant data is used to categorize tasks and weighting of time against each one to determine the efficiency at which the work was performed.

In another embodiment, the categorized data is subjected to analysis by a rules engine that generates messages, performs calculations and reports.

In another embodiment, the aggregate classified data is reported to provide business insights into the resourcing of legal work.

BRIEF DESCRIPTION OF THE DRAWINGS

For a more complete understanding of the present disclosure, reference is made to the following detailed description of exemplary embodiments considered in conjunction with the accompanying drawings.

FIG. 2 is a diagram showing a data structure and sample data input to the system of FIG. 1.

FIG. 9 is a diagram of a training process for a semantic engine in accordance with an embodiment of the present disclosure.

FIG. 10 is a sample report comparing resourcing of two projects in accordance with an embodiment of the present disclosure.

DETAILED DESCRIPTION OF EXEMPLARY EMBODIMENTS

Figure 1:
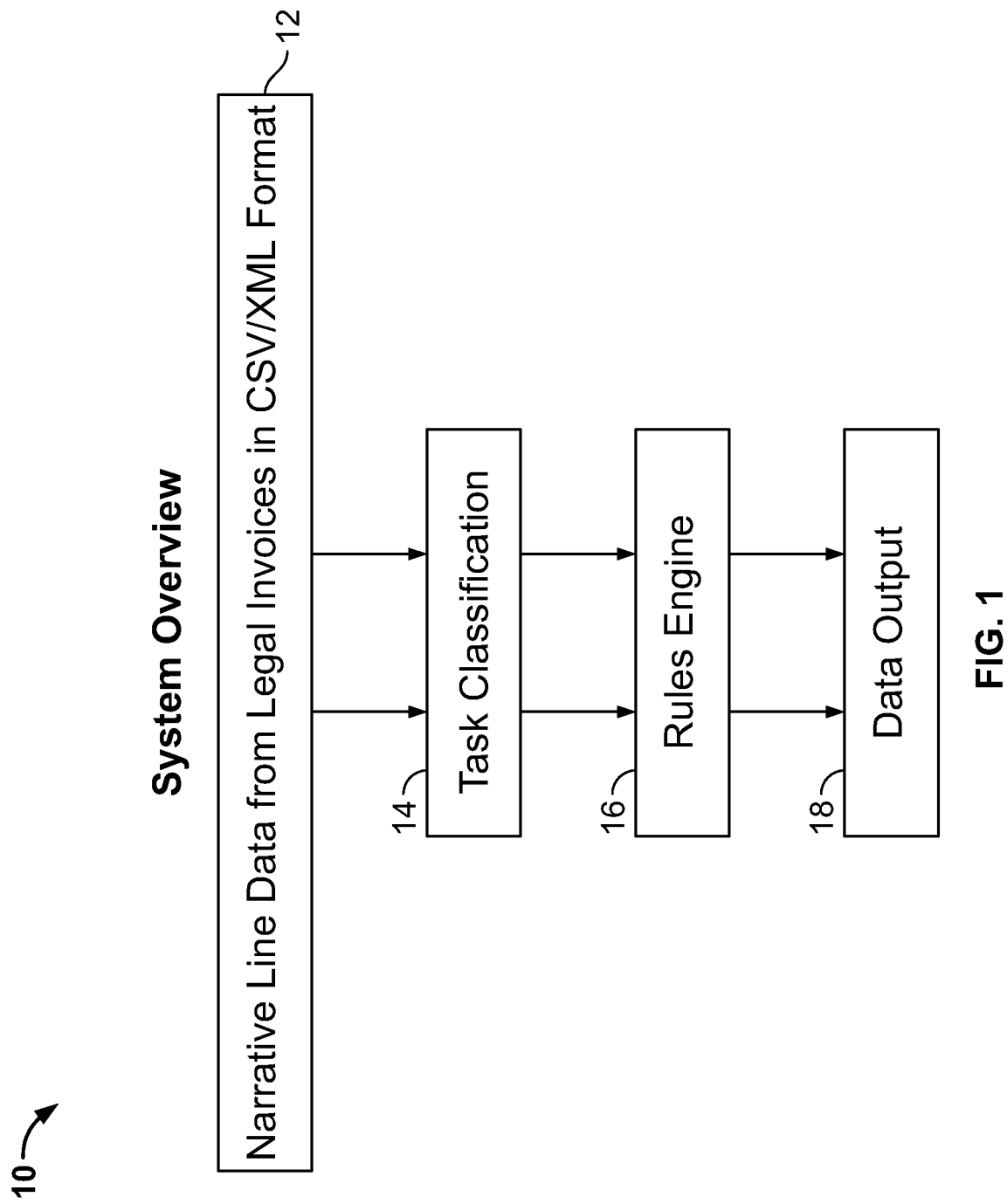
FIG. 1 is block diagram of a compositional and functional overview of a system and method in accordance with an embodiment of the present disclosure.

FIG. 1 shows a system 10 in accordance with an embodiment of the present disclosure. The system 10 receives input data 12, e.g., in the form of an invoice from a vendor, such as a law firm. The invoice may be presented as one or more pages showing multiple lines of description in pdf format or in another format, such as comma separated values (CSV) or XML format. The input data 12 presented by the vendor, e.g., law firm, typically utilizes natural language to describe the services rendered. Other aspects of the invoice, such as the person who performed the work, the time, the hourly billing rate, etc. are also provided. An aspect of the present disclosure is to extract computable data from the natural language input data 12 and infer task classification 14 from the input data 12. The cost of work performed, the amount of effort/time/expense, appropriate use of personnel, etc. may also be analyzed in the categorized data. The analysis may be performed by a rules engine 16, which automatically analyzes the work performed, as reflected in the input data 12. Based on the rules analysis by the rules engine 16, the system 10 may then take automated steps, e.g., perform calculations or to send scripted messages or other notices to the user of the system 10, i.e., produce data output 18. "Data output" 18 may take the form of text messages, arithmetic calculations or logical values, which may trigger additional processing.

Figure 3:
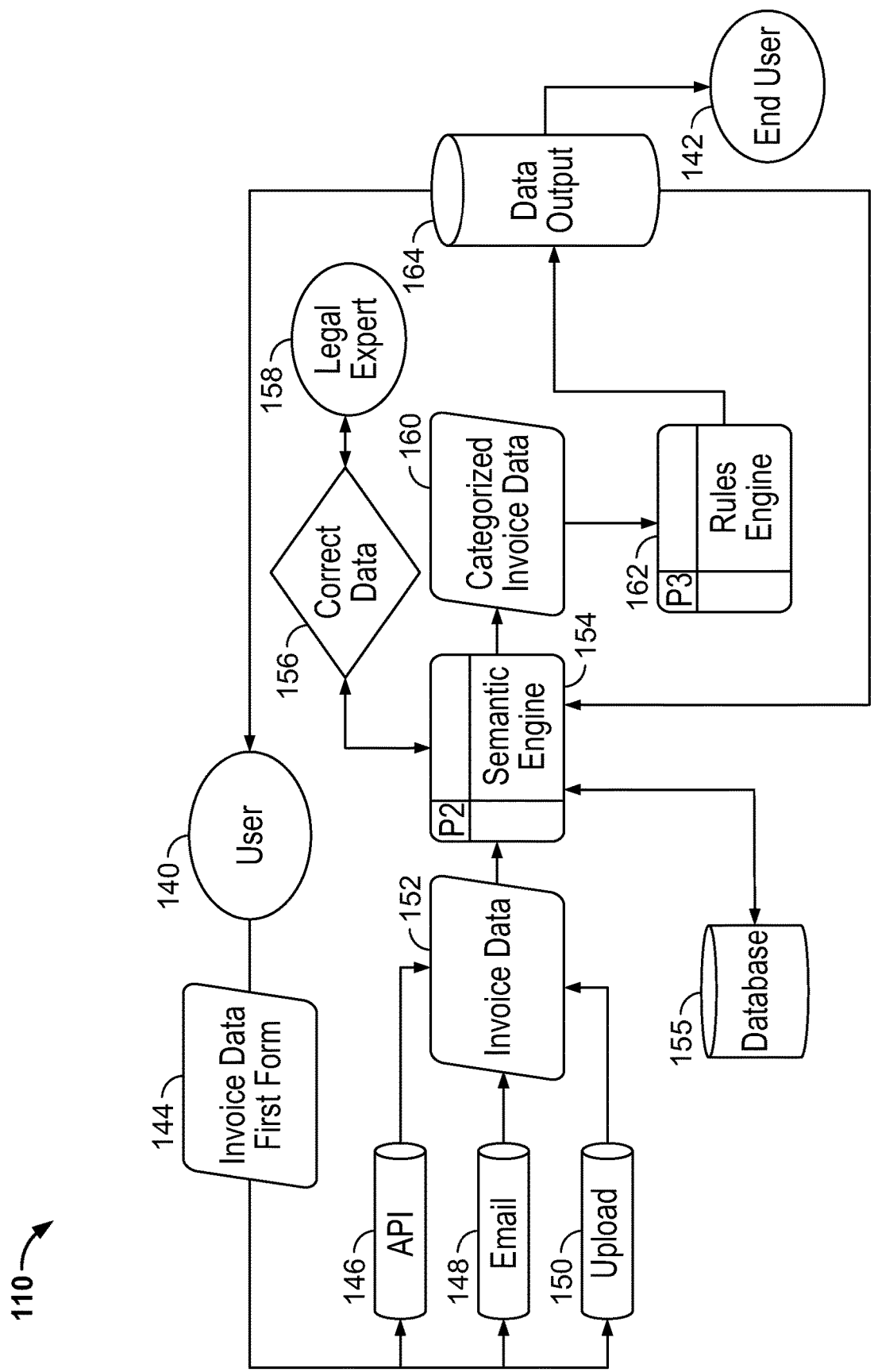
FIG. 3 is a diagram of a system in accordance with an exemplary embodiment of the present disclosure.

FIG. 2 shows a sample 20 of input data 12 (FIG. 1), e.g. as would appear on an invoice for legal services or on a report that collates invoice information for a given time period, for a given client and/or matter. The sample 20 has several types/fields of information, viz., a description 22 of the services, the date 24 that the services were rendered, the time 26, the timekeeper 28, the rate 30 and the total amount billed 32. Three exemplary billing entries 34, 36, 38 are shown. The description 22 for any given entry 34, 36, 38 is typically originally recorded by one or more persons, e.g., an attorney and/or an assistant that enters the billing entry, e.g., 34 into a time entry system. A time entry system can be manual, i.e., handwritten notes on paper, but more typically is a computer-based data entry and recordal system, e.g., that creates a record for each billing entry and that is capable of producing summary reports for each client/matter on a periodic basis, e.g., monthly. Common time and billing software allows persons to enter their time for each matter that they work on. Billing records are typically sorted and summarized on an interim basis to produce invoices to each client. Sample 20 shows two billing entries 34 and 36 attributable to one timekeeper (John Smith—Associate) and one entry 38 attributable to Mary Jones. The description 22 portion of each entry, e.g., 34, is a narrative expressed by a person, e.g., an attorney, in natural language and describes the activities/tasks that were completed in association with that entry. In addition, the timekeeper also records the date 24, the total time expended 26, timekeeper ID 28 and the timekeeper's hourly rate 30. Typically, in computer-based time and billing systems, the total amount charged for the entry 34 would be automatically calculated. As noted above, in reference to FIG. 1, the system 10 receives as input data 12, data of the type and form as the sample 20 shown in FIG. 2. As described more fully below, the system 10 may then classify and analyze the data FIG. 3 shows a more detailed view of a system 110 in accordance with the present disclosure. A first user 140, such as a vendor of professional services, like a law firm or engineering consultant has possession of invoice (time and billing) data 144 in a first/initial state, (like data input 12 of FIG. 1 or sample 20 of FIG. 2), that is applicable to an entity, such as a client/end user 142. The data 144 in the first state may be recorded and available in a variety of forms, such as on paper invoices, digital time and billing records, invoices in pdf, document, file/record form or Excel spreadsheet, as reports on invoicing by a particular service supplier/vendor, etc. Besides an outside vendor, user 140 may be an in-house employee of end user 142, such as a member of the accounting department or business unit responsible for purchasing the service of the end user 142. The first user 140 begins the process by selecting and uploading the required invoice data 144. Invoice data 144 maybe be inputted into the system 110 by API upload 146, Email 148, direct file upload 150 or other data transfer method, producing computer accessible invoice data 152 in digital form, allowing the data 152 to be extracted into correct data fields by the Semantic Engine 154, as explained further below. The Semantic Engine 154 decomposes the invoice data 152 into meaningful fragments pertaining to actions (like reviewing or drafting) performed by the service provider and tasks/objectives, such as a type of document, (like Interrogatories or a Site Survey) that is the object of the action which the service provider performs or is the work product of the service provider. A database 155 containing training data, identification of persons, tables of words and their significance, category definitions, etc. may be accessed by the Semantic Engine 154, as described below. Once the meaningful fragments of a billing entry are parsed out, they can then be fitted into a set of standard categories of actions and tasks/objectives, or categorized. Categorization of billed time facilitates the expression of billed time in standard descriptions and the comparison of such standard categories of billed time to patterns of billing practices of others, to past billing practices, to boundary conditions and limits, etc. In addition, the capability of "unpacking" a description of the services rendered, which is described or "packed" in non-standard natural language (that may vary considerably from timekeeper to timekeeper) also allows the client to compare what was said to be delivered and charged for to what was actually received. An aspect of the present disclosure is that this categorization is conducted largely automatically by a computer. In establishing the discerning capabilities of the Semantic Engine 154, training data developed by human oversight, input and refinement may be utilized. For example, the data output 156 of the Semantic Engine 154 may be considered preliminary output data to be reviewed by a human Expert 158, e.g., a legal expert, who understands the activities and tasks to which the invoice data 152 pertains. The Expert 158 may review and change the categorization of invoice data 152 in output 156 to correct errors and improve efficiency. The corrected data 156 may then be cycled back into the Semantic Engine 154 and/or to the database 155 for reuse as training data. Once the data output 156 exhibits a satisfactory state of correctness, either as result of human correction, or upon sufficient refinement of the Semantic Engine 154, training data and associated accuracy of automated processing without human intervention, the output data 156 may be considered Categorized Invoice Data 160 suitable for analysis by a Rules Engine 162. The Rules Engine 162 may check the categorized invoice data 160 against the parameters defined in one or more rules that are executed by the Rules Engine 162. Execution of rules in the Rules Engine 162 may generate data output 164 that can be accessed and viewed by the End User 142. The categorized invoice data 160 may also be used as a dataset for machine learning in the Semantic Engine 154. Having surveyed the overall operation of the system 10, 110, a more detailed consideration of the components thereof will be undertaken.

The Semantic Engine and the Categorization Function

The present disclosure describes a process of categorizing and analyzing time and billing entries in the context of billing for legal services. It should be understood that this is an example and that the teachings of the present disclosure may be readily extended to billing in other areas. For simplicity, this more general applicability will not be continuously mentioned. To categorize a description contained in a narrative line from a legal invoice, the system 10, 110 uses machine learning systems to categorize text fragments from the description into various legal task categories. A training database 155 of pre-categorized text fragments is generated from a large bank of historical invoice lines categorized by human analysts. By including a large number of examples of text fragments accurately categorized, the variations in how legal tasks are described can be properly sampled. For example, with regard to a task to be categorized as an activity: "reviewing" and a task: "Non-Disclosure Agreement", the language used can vary substantially. Potential ways of describing this task are: "Reviewing NDA", "Attending to Non-disclosure", "Reviewing Non-Disclosure", "Time on NDA ahead of client meeting."

Categories Model

Categories have been defined as actions taken by legal service providers necessary to complete agreed work with a corporate client. This definition can be expanded to include other known types of work e.g. software development, site surveying etc. In accordance with the present disclosure, categorization of billable entries may allow insights into the efficiency of the work done. An aspect of the categorization function and a task categories model is to break down the work in such a way as to give a standardized and accurate overview of the work performed, such that it can be reviewed at both invoice level and at a more macro-level to observe longer term trends. To provide an accurate automated classification of human descriptions of legal tasks, systems and methods are provided that exploit machine learning algorithms for classifying tasks using a high-quality training data set pre-categorized by human legal analysts.

A listing of standardized activities and tasks by which billable tasks may be categorized follows.

Activities
- A101 Plan and prepare for
- A102 Research
- A103 Draft/Revise
- A104 Review/Analyze
- A105 Communicate (within legal team)
- A106 Communicate (with client)
- A107 Communicate (opponents/other outside counsel)
- A113 Communicate (witnesses)
- A114 Communicate (experts)
- A108 Communicate (other external)
- A109 Appear For/Attend
- A110 Manage Data/Files/Documentation
- A112 Billable Travel Time
- A115 Medical Record and Medical Bill Management
- A116 Training
- A117 Special Handling Copying/Scanning/Imaging (Internal)
- A118 Collection-Forensic
- A119 Culling & Filtering
- A120 Processing
- A121 Review and Analysis
- A122 Quality Assurance and Control
- A123 Search Creation and Execution
- A124 Privilege Review Culling and Log Creation
- A125 Document Production Creation and Preparation
- A126 Evidence/Exhibit Creation and Preparation
- A127 Project Management
- A128 Collection Closing Activities
- A111 Other Sample UTBMS Tasks
- L100 Case Assessment, Development and Administration
- L110 Fact Investigation/Development
- L120 Analysis/Strategy
- L130 Experts/Consultants
- L140 Document/File Management
- L150 Budgeting
- L160 Settlement/Non-Binding ADR
- L190 Other Case Assessment, Development and Administration
- L200 Pre-Trial Pleadings and Motions
- L210 Pleadings
- L220 Preliminary Injunctions/Provisional Remedies
- L230 Court Mandated Conferences
- L240 Dispositive Motions
- L250 Other Written Motions and Submissions
- L260 Class Action Certification and Notice
- L300 Discovery
- L310 Written Discovery
- L320 Document Production
- L330 Depositions
- L340 Expert Discovery
- L350 Discovery Motions
- L390 Other Discovery
- L400 Trial Preparation and Trial
- L410 Fact Witnesses
- L420 Expert Witnesses
- L430 Written Motions and Submissions
- L440 Other Trial Preparation and Support
- L450 Trial and Hearing Attendance
- L460 Post-Trial Motions and Submissions
- L470 Enforcement An aspect of the present disclosure is to categorize narrative lines in two ways—as an activity (drafting, communication, review, etc.), and as a specific task (NDA, Due Diligence, IP analysis, Term Sheet etc.). Further, to categorize each task to gain insights into the time spent on each component element of the work done. The number of activities and tasks are not limited and may change as refinements to the model are made over time and the task categories model can grow, with new activities and new tasks, e.g., as shown in the following sample of additional tasks that may be added as new documents and categories of legal work are encountered by the Semantic Engine 154 (FIG. 3). The growth of the number of specific task categories will slow as the model approaches an exhaustive list of all legal tasks in the general body of legal work.

Sample Additional Tasks

| Corporate | Insider Trading issues |
| Corporate | Credit Facility |
| Corporate | Integrated disclosure advice |
| Corporate | Licencing |
| Debt Recovery | Replies to Particulars |
| Debt Recovery | Motion on Discovery |
| IP | Terms and Conditions |
| IP | TM Watch Report |
| IP | Use of TM analysis/evidence |
| IP | Third Party TM application |
| IP | US Patent Office correspondence |
| IP | US TM Certificate of Registration |
| IP | Motion to extend TM opposition |
| IP | TM Searches |
| Litigation | Release agreement |

| | |
|---|---|
| Litigation | Dismissal papers |
| Litigation | Joint representation proposal |
| Litigation | Customer-suit exception issues |
| Litigation | Patent Investigation and Analysis |
| Litigation | Complaint |
| Litigation | Preservation notice |
| Litigation | Accounting issues |
| Litigation | Plaintiff motion |
| Litigation | Motion to Dismiss |
| Litigation | Extension of Time |
| Privacy | Data Processing Agreements |
| Privacy | Timing of board resolution advice |
| Privacy | Data Protection board minute |
| Privacy | DP consent notices |
| Privacy | Company secretarial work |
| Privacy | Consumer law advice |
| Real Estate | Writ |

As described above, standard UTBMS activity categories may be applied. They describe the specific actions of a lawyer, although they do not refer to the task/document worked on. In the alternative, custom activities may be defined and/or added to the list of activities. As can be appreciated, the task categories describe the specific task/document worked on. Standard UTBMS task categories and associated codes may be used as a high-level and limited starting point. In addition, the system 10, 110 may be used to generate unlimited additional new codes, as needed, to increase the granularity and exhaustiveness of the categorization function. The object of the task list and the additional task list is to enable accurate description of the work performed by a lawyer with enough granularity to achieve an accurate assessment of the efficiency of the work done.

Figure 4:
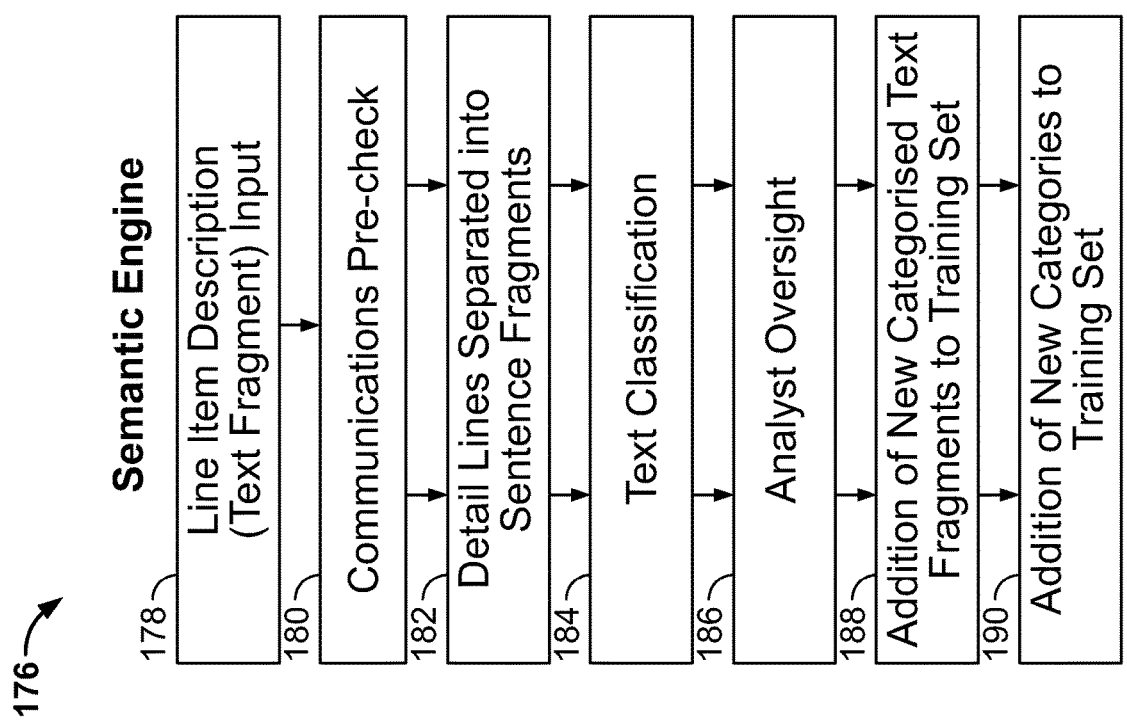
FIG. 4 is a diagram of functions performed by a semantic engine in accordance with an embodiment of the present disclosure.

FIG. 4 shows a diagram of functions 176 performed by the Semantic Engine 154 (FIG. 3) in accordance with an embodiment of the present disclosure. An aspect of proper categorization is to accurately identify which parties were involved in specific communications. "Call with John O'Brien," as a word string without context, could be classified as a call with client, an internal call, a call with a 3rd party, etc. This type of line item description 178, e.g., a text fragment, is subjected to a communications pre-check 180. The Semantic Engine 154, may pre-scan the billing narrative 178 on a given invoice (invoice data 152—FIG. 3) and identify any people or companies referenced in the line. The Semantic Engine 154 then matches the names against a pre-determined set of names to see if the name already exists on the database 155, e.g., in a table of names with affiliation, job title, etc. If it does not, an internal analyst is prompted to add this party to the database 155. The name may be labelled in the database 155 with a token (CLIENT, COUNSEL, INTERNAL or OTHER SIDE). For example, with the segment fragment of a billing entry "Call with John O'Brien", the system 10, 110 recognizes the text fragment "John O'Brien" as a name, and checks if the name is already on record with the external law firm, the internal law department or a third party. If it matches the internal department for example, it will categorize the fragment as an "internal call" because John O'Brien is labelled as 'INTERNAL'. At step 182 sentence fragments may be separated by identifying punctuation, double spaces or other delimiting character(s). This has utility in the function of the Semantic Engine 154 by separating different tasks described in one block of text (billing entry). The Semantic Engine 154 looks for relevant punctuation and separates each text fragment as a distinct text fragment to be classified.

At step 184 Text Classification, the Semantic Engine 154 may use multiple methodologies to categorize the invoice data 152 narrative lines into the relevant categories from the categories model 170 based upon the description portion 22 (FIG. 2). The initial training data for training the text classification 184 algorithm may be human generated, with correctly categorized sentence fragments added to the training data over time. In one approach, a training database 155 of categorized text fragments may be generated from a large bank of historical invoice lines categorized by human analysts to conduct text classification 184. Thousands of text fragments from a cross section of legal invoices that have been categorized manually by trained legal analysts may form the initial basis upon which the semantic engine 154 starts to categorize lines of billing entries.

When the system 10, 110 is used, analyst oversight 186 may be employed, particularly, when the system 10, 110 is first established, to allow refinement of the training data by correcting incorrect text classification. The semantic engine 154 may be corrected by human analysts when it classifies something incorrectly, or fails to recognize and categorize a sentence fragment. A consequence of analyst oversight 186 is the addition 188 of new categorized text fragments to the training set in the database 155. As a consequence, the training database 155 grows over time as the number of correctly categorized sentence fragments grows, negating the need for human supervision as the accuracy approaches 100%. The correction of errors is recorded by the system 10, 110 and added to the training data. As the training data set increases in size, the accuracy of the classification methodology approaches 100%.

Figure 5:
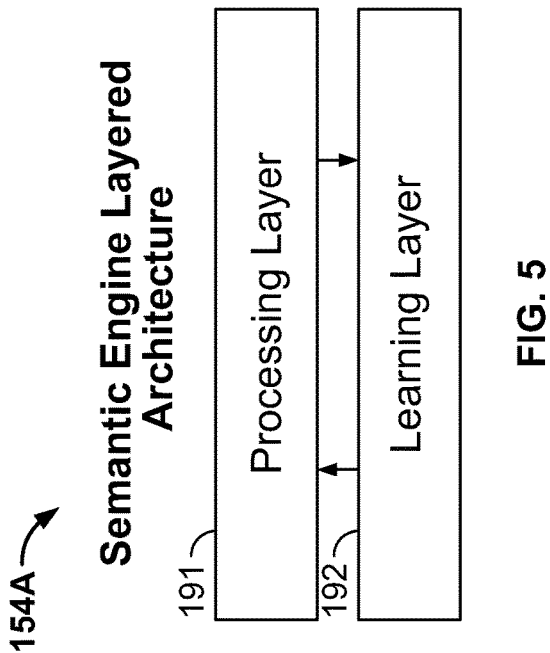
FIG. 5 is a diagram of semantic engine architecture in accordance with an embodiment of the present disclosure.

FIG. 5 presents an overview of the semantic engine architecture 154A, which has two layers. The processing layer 191 is responsible for applying categorization to new invoices which are entered into the system and presenting this as output to the wider application. The learning layer 192 creates the training dataset for model learning and trains the semantic model to recognize the different categories of work. The processing layer 191 is fully automated with machine learning models categorizing types of work done but can be integrated with the learning layer 192 depending on final application configuration.

Figure 6:
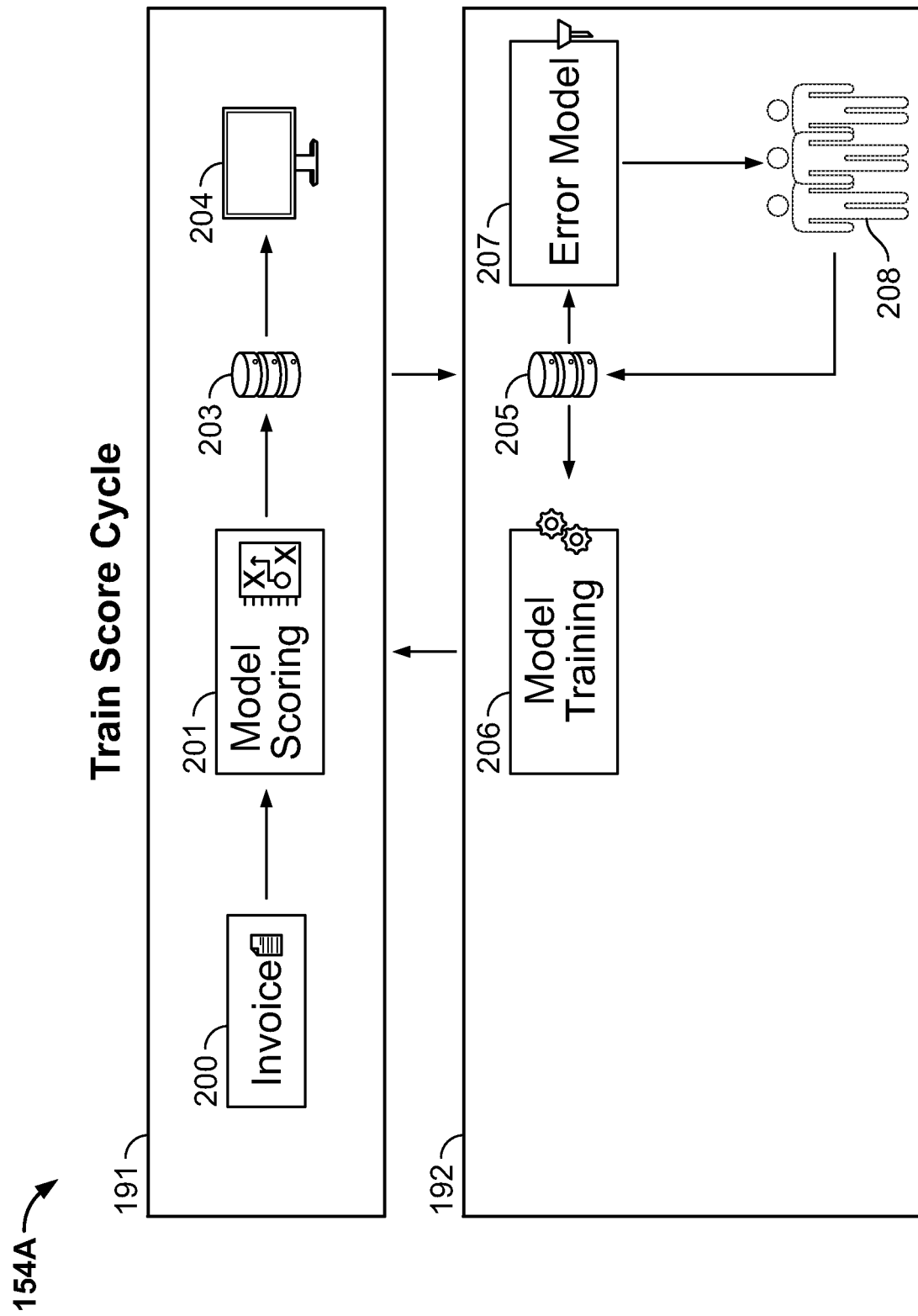
FIG. 6 is a diagram of a semantic engine train-score cycle in accordance with an embodiment of the present disclosure.

FIG. 6 illustrates this architecture 154A in more detail. The semantic engine model 206 is trained based on data imported from a training database 205. This model is then transferred to the processing layer 191 for use in scoring 201. When an invoice 200 is imported into the system for scoring 201 data is output to users on output devices such as tablets or laptop monitors 204 via a repository interface 203.

The training dataset 205 imports data from the processing database 203 following model scoring. The curation of the training dataset is overseen by expert users 208 who filter data to be fed into the training database 205. This correction or the original model classification is then fed back into the training database 205 for model tuning and retraining in 206. Control of the data that is reviewed by expert users 208 is executed via an error model 207. The error model 207 ensures that only data items that require urgent manual review are routed for expert analysis, e.g., data for which there is a high probability of error for automated classification. Data that is low risk is automatically loaded into the training dataset 205.

Figure 7:
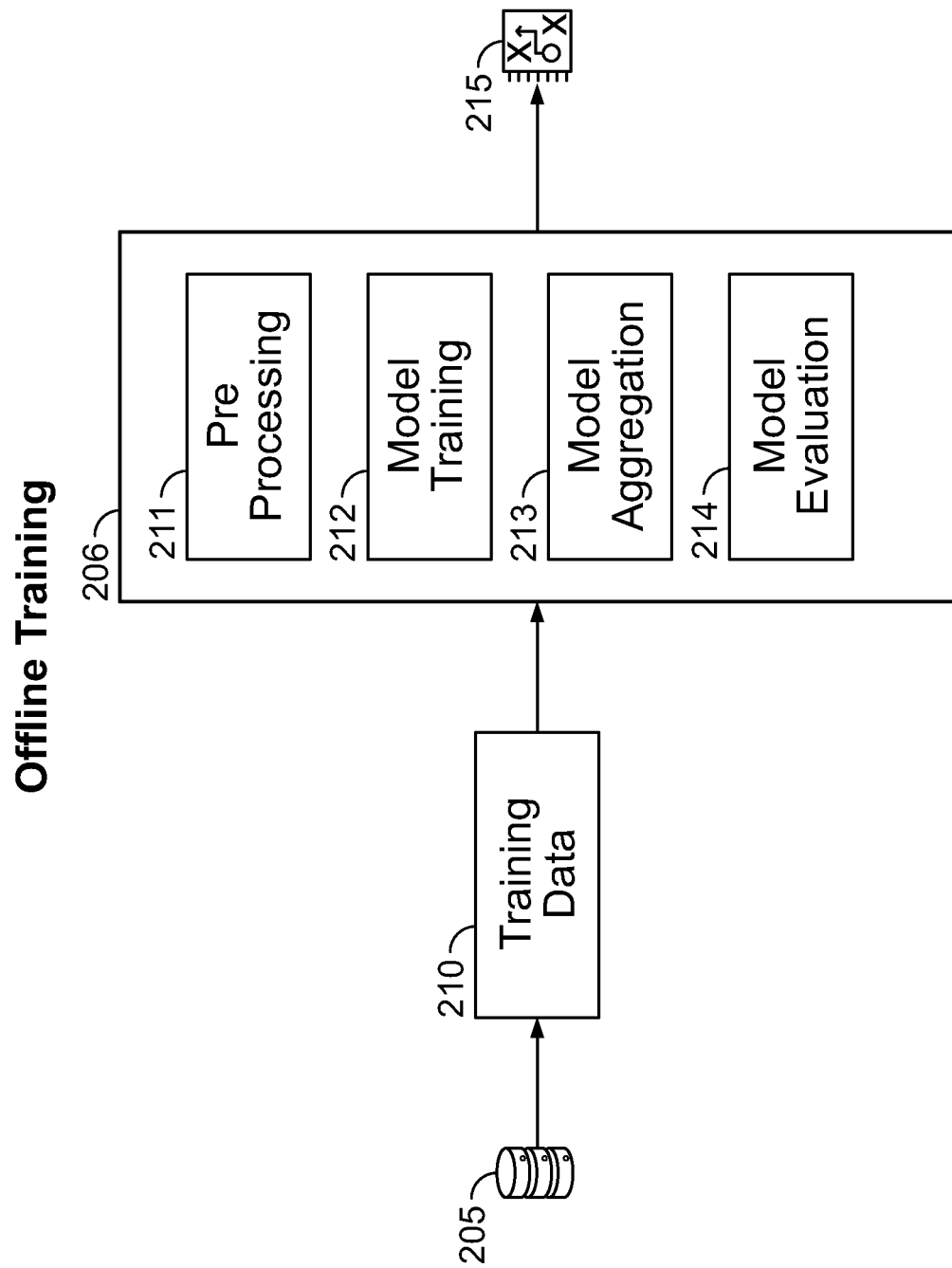
FIG. 7 is a diagram of a training process for a semantic engine in accordance with an embodiment of the present disclosure.

FIG. 7 outlines the processes conducted by model training 206 in more detail. A subset of data 205 is exported as training data 210. The training data 210 is then transformed in a number of steps, as shown. During Pre-Processing 211, data is transformed into a format appropriate for model training that exposes relevant word derived features to the model building algorithm. In model training step 212, a model is trained for each of the target categories in the category set of the listing of standardized activities and tasks by which billable tasks may be categorized described above, i.e., Activities, e.g., A101 Plan and prepare for, UTBMS Tasks, e.g., L100 Case Assessment, Development and Administration and Additional tasks, e.g., Corporate Insider Trading Issues. Results from constituent models are aggregated 213 to produce an aggregate result set. Model evaluation metrics are calculated 214 for review or as stage gates prior to model deployment. The model 215 produced can then be used for scoring.

Figure 8:
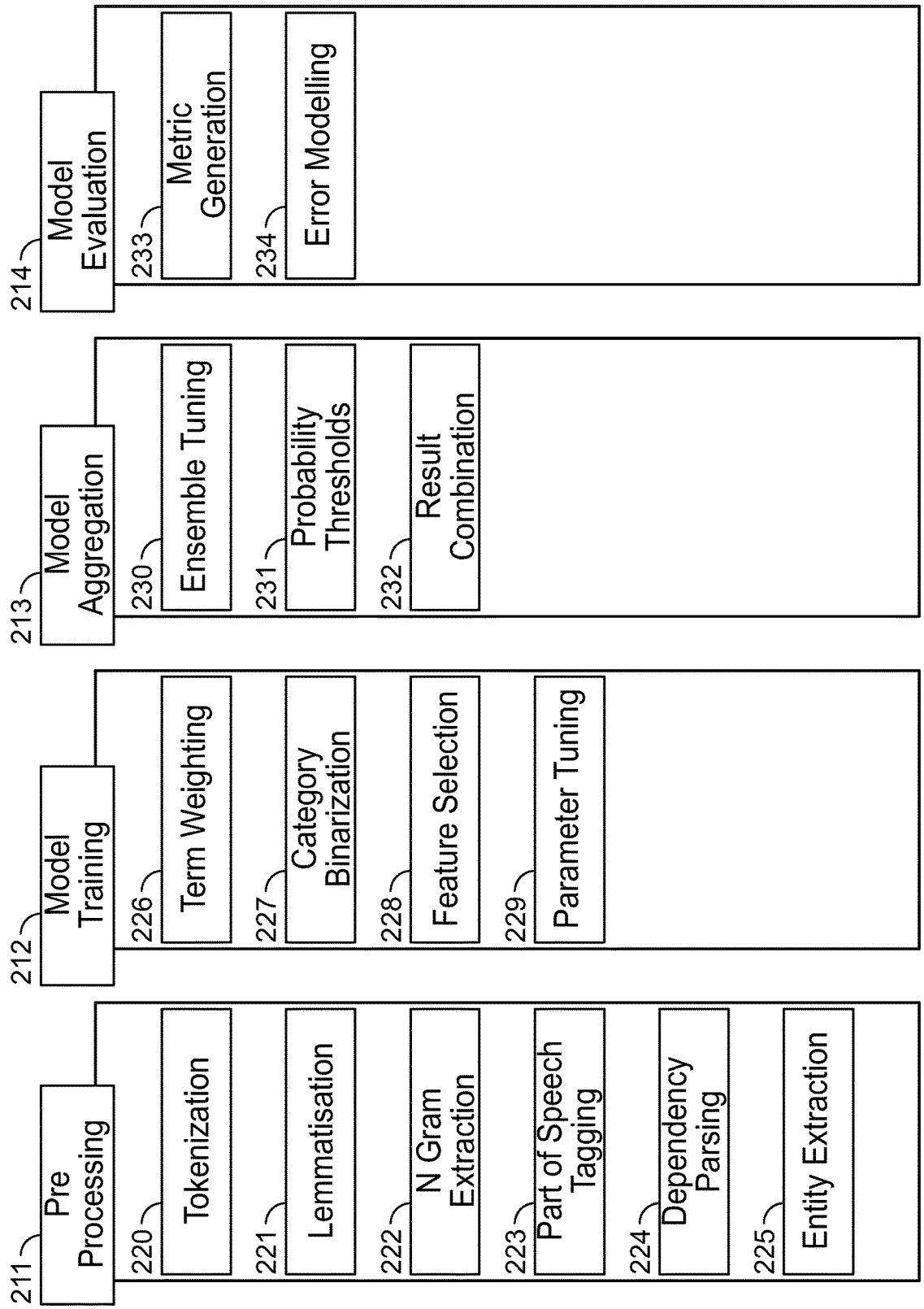
FIG. 8 is a diagram of semantic engine training activities in accordance with an embodiment of the present disclosure.

These steps are illustrated in more detail in FIG. 8. In the preprocessing stage 211, text is tokenized 220 into word and sentence fragments. Words are then transformed into a lemmatized or canonical form 221. For example, "regards" and "regarding" can be lemmatized into the short form "regard". In n gram extraction 222, word n grams are extracted from the text. An n gram is an n- length token combination. For example the sentence "Call with client regarding tender" contains 5 n grams "Call with", "with client", "client regarding", "regarding tender". Part of speech tagging 223 tags words with appropriate parts of speech such as noun, verb, adverb. Dependency parsing 224 analyses the syntactic structure of a sentence, for example, tagging words as conjugate, objects and subjects. Entity extraction 225 extracts named entities such as persons and companies from the text.

In model training 212, predictive machine learning models are built from preprocessed and categorized text data. These models are used for scoring new inputs. The model algorithm is not pre-specified and is assessed based on evaluation criteria. For example, Support Vector Machine, Neural Network or General Linear models will be generated and tested, with the best performing model used in production. A number of common steps are carried out here regardless of the model type. Term weighting 226 applies weightings to input terms. For example, terms may be weighted via TF-IDF weighting criteria so that terms that occur infrequently across a corpus are given higher weightings than commonly occurring terms. Category binarization 227 refers to the process of generating binary models for each category to be predicted. Feature selection 228 selects only text features that are correlated to a model target for use in the model training process. Parameter tuning 229 is a search process whereby permutations of input parameters are evaluated against some criteria, such as accuracy, to assess what are the optimal sets of model parameters. For example, an algorithm such as a Support Vector Machines requires error thresholds to be configured prior to model training.

Model aggregation 213 refers to the combination of outputs from the constructed models to deliver a combined result. Ensemble tuning 230 configures how the constituent models will be combined in an ensemble. Probability thresholds 231 sets thresholds for prediction probabilities. Results combination 232 combines results using the given parameters.

Model evaluation 214 generates evaluation metrics for model training and ongoing evaluation. Metric generation 233 delivers model evaluation metrics such as accuracy, precision and recall for assessment of model fit. Error modelling 234 generates error models which can be used to prioritize records for manual review.

FIG. 9 further expands on the offline scoring process outlined in FIG. 6. Invoice data 200 is entered into the system. This data is scored in by model scoring module 201 and output to a repository 203 and for user analysis 204.

The steps conducted by online model scoring module 201' follow much the same process outlined in FIGS. 7 and 8. The preprocessing 211' and aggregation 213' steps are the same as in FIG. 7, however, the model scoring step 212' utilizes the model objects generated in the training stage to score new data 200.

Time Assignment

Once the task/tasks are identified from the textural description of services, the system 10 will also apply the stated time expended by the service provider taken against said tasks. When there is only one task associated with a description, the entire time is allocated to that task. In the case where multiple tasks are assigned to a description—it is determined that 'block billing' has occurred. This is where two or more separate tasks have been described in a single line item. In this case, the Semantic Engine 154 divides the time evenly across tasks for the purpose of allocating time to each classification. In specific instances, the classifier will allocate uneven time, as pre-determined by the parameters around certain task combinations. For example, for the detail line—"Liaising with John O'Connor on NDA, call with client regarding same, and redrafting NDA to incorporate changes: 1 hour, 30 minutes", the categorization would be (with time allocated equally):

Internal communications: 30 minutes

Call with Client: 30 minutes

Drafting: 30 minutes.

However, on the following detail line—"Preparing for and attending client meeting on site: 2.5 hours," the categorization would allocate unequally:

Preparation: 36 Minutes (20% of total time)

Client Meeting: 114 Minutes (80% of total time).

The following shows the contents of a sample output report generated by an embodiment of the system 10, 110 and method of the present disclosure. In one example, the categorized invoice data contains an aggregate of task categories across a single invoice.

Specific-Task Breakdown

| Expert Report | €3,186 | 15.65% |
|---|---|---|
| Briefs to Counsel | €3,069 | 15.07% |
| Settlement Agreement | €1,928 | 9.47% |
| Pleadings Review | €1,774 | 8.71% |
| Discovery motion | €1,390 | 6.83% |
| Discovery review | €712 | 3.5% |
| Facility Letter | €596 | 2.93% |

The report may contain activity categories and a percentage against each aggregate amount, as follows.

Activity Breakdown

| A103 Draft/Revise | €5,250 | 25.79% |
|---|---|---|
| A106 Communicate (with client) | €3,913 | 19.22% |
| A107 Communicate (outside counsel) | €3,228 | 15.86% |
| A104 Review/Analyze | €2,654 | 13.04% |
| A105 Communicate (internal) | €1,888 | 9.27% |
| A125 Document Production & Preparation | €1,254 | 6.16% |
| L400 Trial Preparation and Trial | €1,094 | 5.37% |
| E109 Local travel | €784 | 3.85% |
| A114 Communicate (experts) | €231 | 1.14% |

The report may also contain a summary of fee earner breakdown by percentage:

Fee Earner Breakdown
Senior Partner 48%
Senior Associate 48%
Trainee 3%

Once categorized, the invoice data may then be checked by the Rules Engine 162 (FIG. 3).

Rules Engine, Function and Output

The object of the Rules Engine 16, 162 (FIG. 1, FIG. 3) is to automatically query the categorized data 160 against various criteria and parameters to determine whether the work billed for has been performed optimally. This criteria includes generally accepted best practice norms (e.g., tasks should not be performed by a junior lawyer, only to be corrected by the work being repeated by a more senior lawyer), specific billing guidelines and/or terms of engagement with a specific user and their suppliers (e.g., administrative work should not be billed to the client), and emergent norms in legal staffing identified through the invention (e.g., Average partner time for low value M & A work in London is 55% of entire matter).

A sample set of rules in accordance with an embodiment of the system and method of the present disclosure are shown below. The Rules Engine 162 applies rules-based parameters against the data. The rules may include a number of standard 'billing guidelines' that are best-practice resourcing guidelines for large corporates to have agreed with outside legal services providers. The rules may be added to and expanded by end-users 142 (FIG. 3). The parameters of the rules can be changed for organization-specific, or project-specific agreed guidelines between supplier and purchaser. Examples of rules of this type, would be: "Work must be performed at the correct seniority, Administrative work must not be charged for, timekeepers must not charge for more than 12 hours in a given day." The following are examples of rules that may be executed by the rules engine 16, 162.

Sample Rules

Block Billing: Any narrative line with more than 2 tasks is flagged.

Reduction to apply: 50% of charge.

Administrative Work: Any tasks categorised as 'Administrative work' is flagged.

Reduction to apply: 100% of charge

Internal Communications: Any internal communications above 10% of entire spend is flagged. Reduction to apply: 100% of any charge above 10% of total charge on invoice Appropriate Resourcing: Task 'Security review' and task 'Drafting Board Minutes' flagged if performed by level higher than Junior Associate.

Reduction to apply: 50% of charge

The rules may also be supplemented and parameters changed by the system 10, 110 as geographical/industry norms are identified through existing rules applications by the Rules Engine 162. For example, the "Percentage of partner time allowable" flag may trigger over 40% in one jurisdiction or industry, but triggers at over 50% in another. When a breach of the rules 310 occurs, it may trigger a 'flag'—available for view by the end user 142 on analysis of an invoice.

The execution of a set of rules by the Rules Engine 162 may result in a report being generated and shown to the end user 142 (FIG. 3), as shown in the following example of report content.

REPORT CONTENT EXAMPLE

Flag: Senior Associate Attendance on Call

Approximately €799 was charged for the attendance of Tim O'Connor, Senior Associate on calls at which Monty Peters, Partner also attended. Glass Corp to consider whether the charging of Tim O'Connor, Senior Associate is appropriate in these circumstances. Potential saving: $799.

Flag: Block Billing

The bill contains a number of instances of block billing as itemised below. If a 50% reduction is applied to the time entries containing block billing savings of $5,787 can be achieved. Potential saving: $5,787.

Flag: Administrative Support Costs

A total of approximately $3,487 was charged for the following prohibited administrative tasks: (i) proof-reading; and (ii) printing. Potential saving: $3,185.

Flag: 1st Year Associate Time

A total of $52,250 was spent by 1st year associates in breach of the TechCo guidelines. Potential saving: $52,250.

Flag: Read-in Time

Approximately $2,090 of time was charged by C. Dunleavy, Partner (28 years) reviewing documentation following vacation. Potential saving: $2,090.

The preceding report content includes a name for the flag, a description of the flag and a potential cost savings. The descriptions of the flags are automated, standardized text inputs with variables where appropriate, mimicking a human natural language description of the violation, a description, and a recommended course of action. The potential saving is calculated by applying a reduction stipulated in the Rules Engine 162. Other usages of the data output may be for visualization and reports of data across particular departments/projects/jurisdictions.

FIG. 10 is a sample report 340 comparing the resourcing of two similar projects (Projects A and B). The task make-up of similar work is compared with a view to comparing the efficiency of two external legal service providers.

Figure 11:
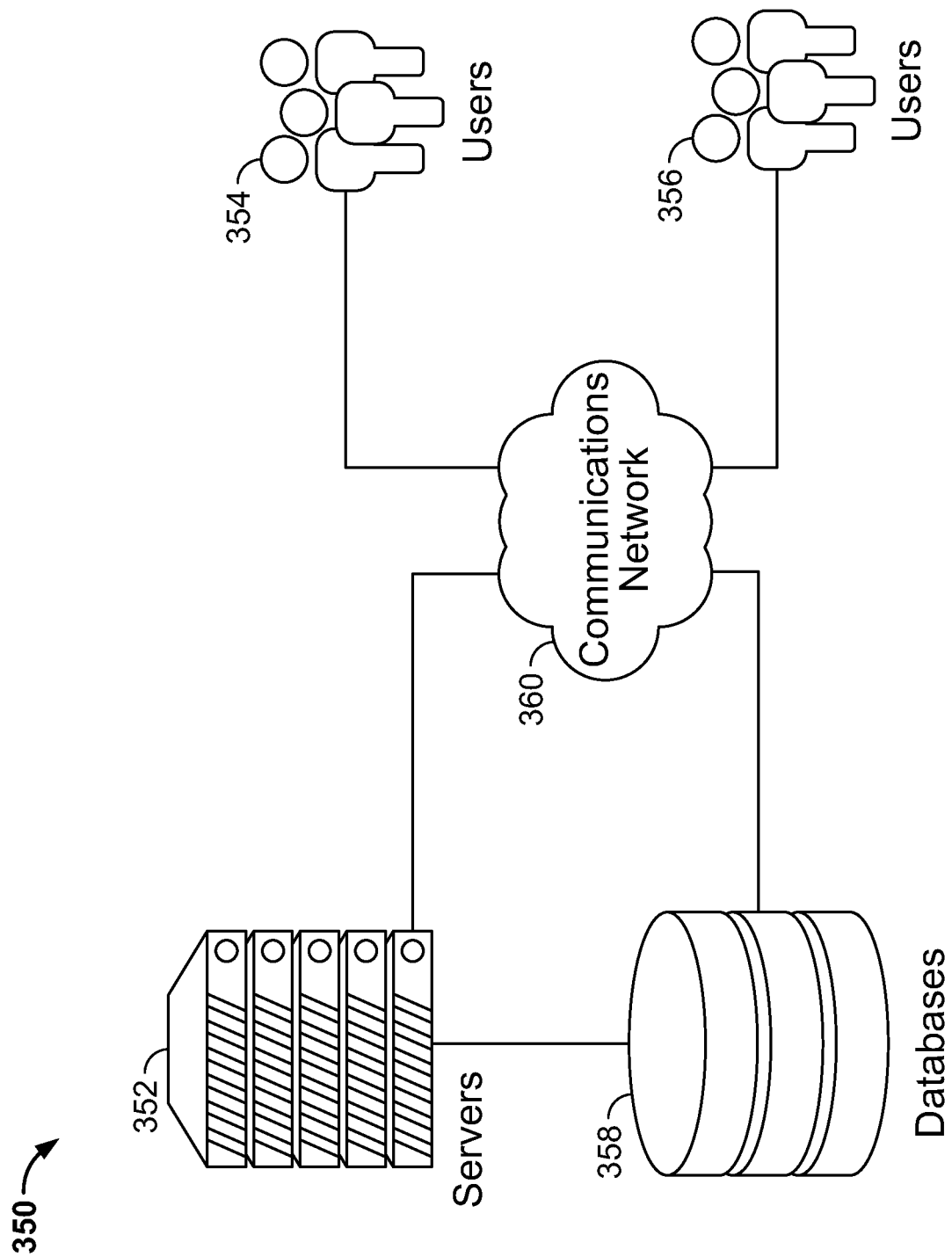
FIG. 11 is a diagram of hardware and networking of a system and method in accordance with an embodiment of the present disclosure.

FIG. 11 shows a distributed system 350 for implementing embodiments of the system 10, 110. The distributed system 350 includes one or more servers 352 coupled to clients/users 354, 356 via a communication network 358. The servers 352 and/or the clients 354, 356 can be computing devices. The distributed system 350 preferably includes one or more repositories or databases 358, which can be in communication with each other, as well as with the servers 352 and the clients 354, 356 via the communications network 358. The servers 352, clients 354, 356, and/or databases 358 can store information, such as components of the tool 382 (FIG. 16), i.e., the operational components of the system 10, 110, such as the Semantic Engine 154, the Rules Engine 162 and other program elements and/or can store information generated by the tool 382. The tool 382 can be distributed among the servers 352, clients 354, 356 and/or databases 358, such that one or more components of the tool 382 can be located at different devices (e.g. clients, servers, databases) in the communication network 358. For example, a mapping unit and analysis unit can be implemented by the server 358, GUIs can be implemented by the server 352, and a financial transaction information, budget, and financial unit can be stored and maintained in the database 358. The client 354, 356 can include an application for accessing the tool 382 via the GUIs.

Figure 12:
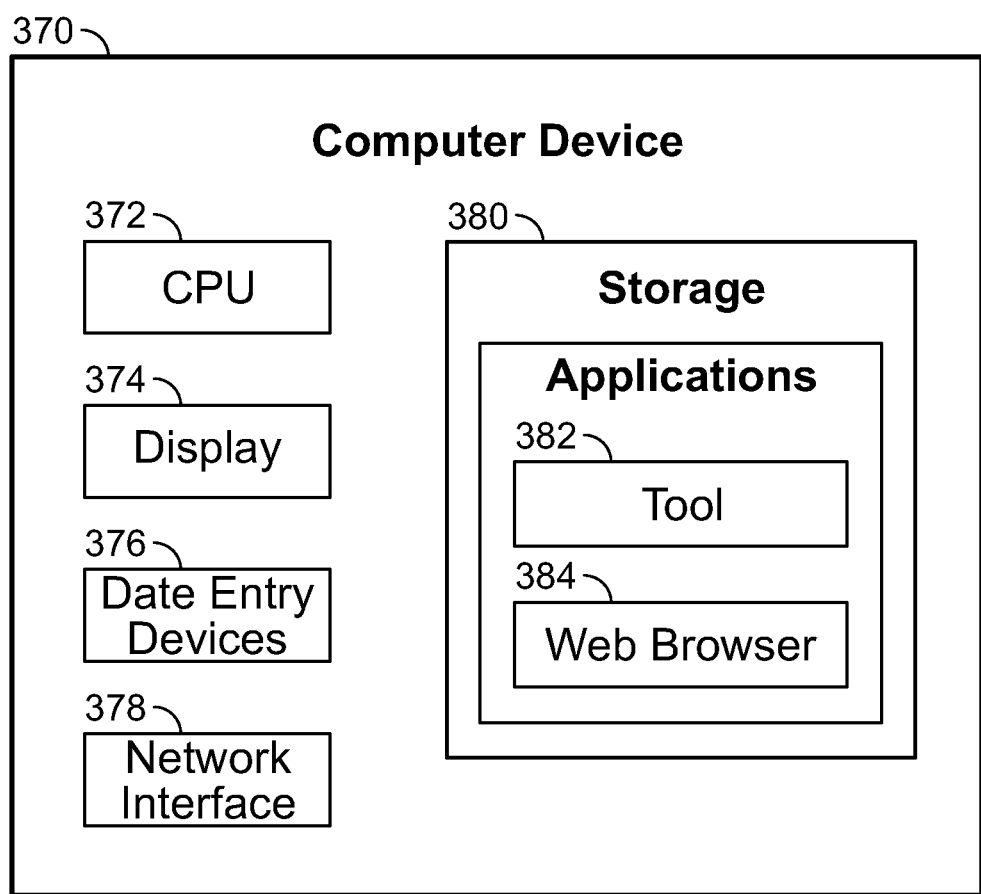
FIG. 12 is a diagram of computer hardware and software in accordance with an embodiment of the present disclosure.

FIG. 12 shows an exemplary computing device 370 suitable for practicing the embodiments of the present invention and can be used to implement the servers 352, the clients 354, 356, and/or the databases 358. The computing device 370 can be a mainframe, personal computer (PC), laptop computer, workstation, handheld device, such as a PDA, a cell phone, or the like. In the illustrated embodiment, the computing device 370 includes a central processing unit (CPU) 372 and a display device 374. The CPU 372 controls each component of the computing device 370 to provide components of the tool 387. The display device 374 enables the computing device 370 to communicate directly with a user through a visual display and can graphically display GUIs. The computing device 370 can further include data entry device(s) 376, such as a keyboard, touch screen, mouse, and the like, to allow the user to interact with the tool 382. The computing device 370 can include storage 380 for storing information, such as financial transaction information, budget, a financial unit and the like. The storage 380 can include such technologies as a floppy drive, hard drive, tape drive, Flash drive, optical drive, read only memory (ROM), random access memory (RAM), and the like.

Applications 384, such as the tool 382, or components thereof, can be resident in the storage 380 when the computing device is implemented as the servers 352. For embodiments of the computing device 370 implemented as clients 354, 356, the computing device 370 can also include a web browsing application 384 to allow user to interact with the GUIs of the tool 382. The applications can include code known to those skilled in the art that when executed can be used to implement the tool 382 and/or web browsing application 384. The code can be composed of at least one of C, C++, Java, JavaScript, Basic, Perl, assembly language, machine code, Hypertext Markup Language (HTML), Dynamic Hypertext Markup Language (DHMTL), eXtensible Markup Language (XML), eXtensible Style Language (XLS), Scalable Vector Graphics (SVG), and the like.

The storage 340 can be local to the computing device 370 and/or can be implemented remotely as, for example, the databases 358 accessible by one or more computing devices. The computing device 370 can also include a network interface 378 for communicating with a network and can be used for a distributed implementation. The CPU 372 operates to run the applications, such as the tool 382, in storage 380 by performing instructions therein and storing information resulting from the performed instructions, which may be graphically depicted via the display 374.

Aspects of the present disclosure include a method for the analysis of professional services and timekeeper narratives including the import of invoice data into a repository; the automatic classification of invoice lines via machine learning models including but not limited to the action undertaken such as 'review', 'draft' etc. and the object of the action e.g. Non-Disclosure Agreement', 'Client Accounts for Calendar Year'; the application of billing guidelines specified as rules and generated via statistical analysis to invoice lines; the presentation of analyzed and collated data to a user via a computing interface such as a mobile device, desktop computer etc.

In another aspect, a system for the automated analysis of professional services invoices and timekeeper narratives features: the import of invoice data into a repository; pre-processing of invoice lines to extract key information including but not limited to timekeepers, rates, amounts and narrative lines; the automatic categorization of invoice narrative lines by a semantic analysis module transforming text data into structured categories; the extension of the semantic analysis module via retraining on new data; the application of billing rules and statistical analysis to invoice data; and the presentation of analyzed invoices to an end user via a display device.

In another aspect, the repository and processing is remote from the user site, e.g., on cloud infrastructure. In another aspect, the repository and processing is local to the user organization. In another aspect, the system provides for the improvement of the semantic analysis module by: generating categorization for an invoice or timekeeper narrative line by a semantic model; assessing the classification accuracy via an error model; presenting users with a view of classified narrative lines including an assessment of the accuracy of classification; changing the applied classification for a narrative line via a user's interface, which may be via a web browser, a mobile application, voice interface etc.; and retraining the semantic model with the new classification data extending the model's understanding of domain language usage.

While embodiments of the present invention have been described herein, it is expressly noted that the present invention is not limited to these embodiments, but rather the intention is that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the disclosure. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the disclosure.

We claim:

1. A system for the automated analysis of actual invoices and timekeeper narratives included therein, comprising:
a computer having a processor;
a data store accessible to the computer and capable of storing invoice data in digital textural form;
a semantic engine capable of running on the processor, the semantic engine having a learning layer and a processing layer, the learning layer being configured to receive training data containing accurately decomposed and categorized sample invoice data, including narratives, from a training sample of invoice data and develop a training model, the decomposed and categorized sample invoice data including a set of standardized categories of actions, each of which describes an action that may be performed by a timekeeper, and objects of actions, each of which describes an object upon which an action is performed by a timekeeper, the processing layer being configured to process actual invoice data associated with an actual invoice in accordance with the training model, to decompose timekeeper narratives in the actual invoice data describing work performed by a service provider into fragments pertaining to actions performed and objects of actions by the service provider, and to categorize the decomposed fragments into at least one of the set of standardized categories of actions and objects of actions for forming categorized invoice data in accordance with the training model, and
a rules engine capable of running on the processor, the rules engine having access to at least one rule applicable to the at least one of the set of standardized categories of actions and objects of actions, the at least one rule including one or more billing guidelines,
wherein the rules engine is configured to receive the categorized invoice data from the semantic engine, to apply at least one of the one or more billing guidelines of the at least one rule to the categorized invoice data associated with at least one of the timekeeper narratives, and to generate an output consistent with the at least one rule, the output including results of an analysis including at least one determination of whether work associated with at least one of the timekeeper narratives has been optimally performed.

2. The system of claim 1, further comprising a reporting engine, the reporting engine being configured to generate reports to a user of the categorized invoice data based on an application of the at least one rule, and
   at least one additional computer connected to the computer via a network, the at least one additional computer being configured to permit the distribution of data storage and to process tasks performed by the system over the computer and the at least one additional computer.

3. The system of claim 1, wherein the learning layer is configured to generate a database of pre-categorized text fragments based upon prior evaluation of the training sample of invoice data and to store the database on the data store accessible to the computer, and wherein the processing layer is configured to access the database.

4. The system of claim 3, wherein the processing layer is further configured to evaluate an accuracy of the categorized invoice data, resulting in additional entries to the database.

5. The system of claim 1, further comprising a database of a plurality of identities corresponding to a plurality of persons associated with at least one of the service provider or a recipient, and including a plurality of roles of the plurality of persons, to store the database of the plurality of persons in the data store, the semantic engine being configured to refer to the database of the plurality of persons and to incorporate the plurality of roles of the plurality of persons while processing the actual invoice data, including narratives.

6. The system of claim 1, wherein at least one rule includes at least one of best practice norms or terms of engagement.

7. The system of claim 1, wherein the at least one rule is configured to be changed under the direction of a recipient of the output.

8. The system of claim 1, wherein the rules engine is configured to generate a pre-determined output message in response to detecting a violation of the at least one rule.

9. The system of claim 1, wherein the processing layer of the semantic engine is configured to pre-process the actual invoice data by tokenizing the actual invoice data into word and sentence fragments and then transforming the word and sentence fragments into a lemmatized form.

10. The system of claim 9, wherein the processing layer is configured to process the lemmatized form of word and sentence fragments by n gram extraction as part of a speech tagging and dependency parsing through analysis of syntactic structure of the actual invoice data.

11. The system of claim 9, wherein named entities are extracted from the actual invoice data.

12. The system of claim 1, wherein the learning layer is configured to implement model training, model aggregation and model evaluation.

13. The system of claim 12, wherein the model training includes weighting, category binarization, feature selection and parameter tuning.

14. The system of claim 12, wherein the model aggregation includes ensemble tuning, probability thresholding and result combination.

15. The system of claim 12, wherein the model evaluation includes metric generation and error modeling.

16. The system of claim 1, wherein the semantic engine is configured to develop a database of people and billing rates and to store the database of people and billing rates in the data store accessible to the computer, and is further configured to calculate charges by persons on behalf of the service provider.

17. The system of claim 1, wherein the semantic engine is configured to match the name of at least one person named in the timekeeper narratives against a pre-determined set of names of individuals and to determine the categorization of the decomposed fragments into the at least one of the set of standardized categories of actions and objects of actions.

18. The system of claim 17, wherein the pre-determined set of names of individuals include affiliation and titles of the individuals, the semantic engine being configured to determine whether the categorization of the decomposed fragments into the at least one of the set of standardized categories of actions and objects of actions should be classified as internal or external of the service provider.

* * * * *